May 14, 1963
A. S. JENKINS
3,089,414
HOLLOW CONTAINER DECORATING APPARATUS
Filed Jan. 3, 1961
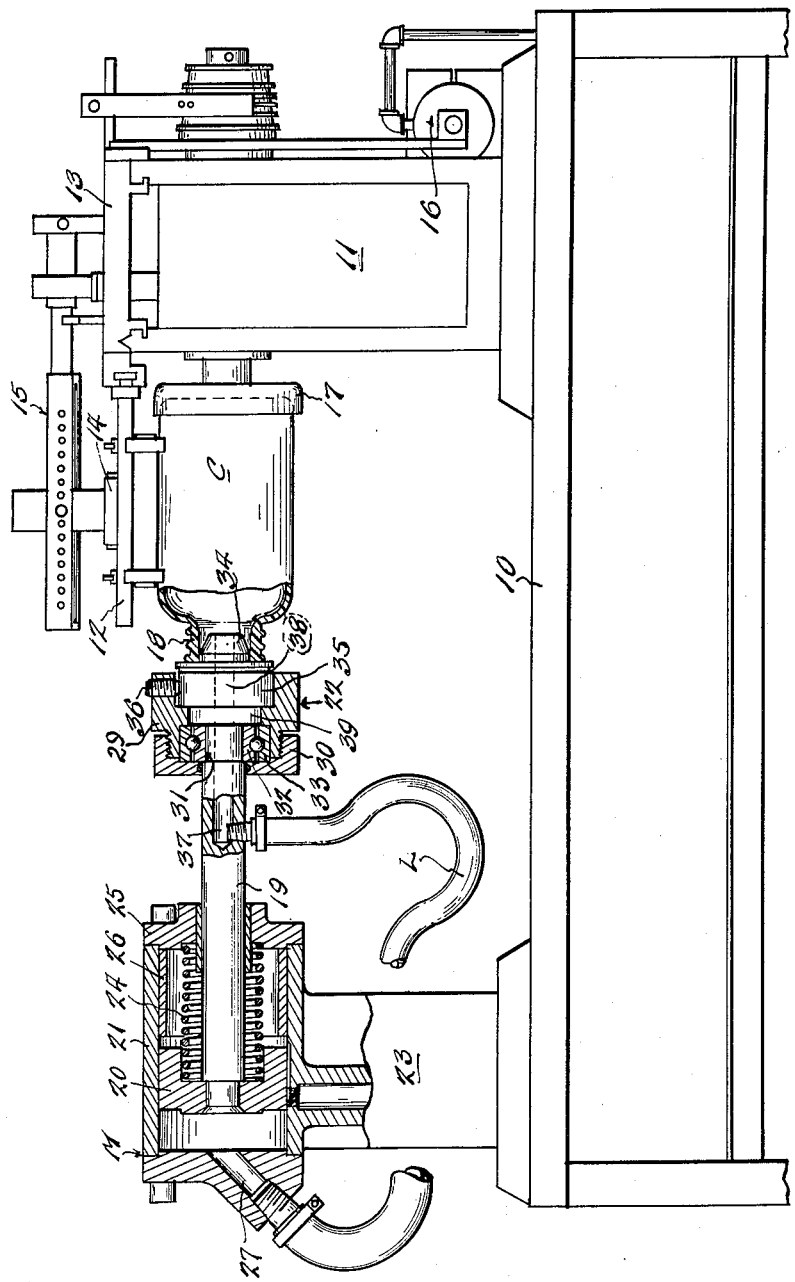
INVENTOR.
A. S. JENKINS
BY W. A. Schaich
and Spencer L. Blaylock Jr.
ATTORNEYS

United States Patent Office

3,089,414
Patented May 14, 1963

3,089,414
HOLLOW CONTAINER DECORATING
APPARATUS
Albert S. Jenkins, Toledo, Ohio, assignor to Owens-Illinois Glass Company, a corporation of Ohio
Filed Jan. 3, 1961, Ser. No. 80,137
3 Claims. (Cl. 101—124)

My invention is a novel and commercially efficient apparatus for use in the printing upon, or decoration of the exterior surface of blown plastic containers.

More particularly, my invention is a novel chucking means functioning both to position and hold a hollow plastic container for engagement with a printing die, screen, or the like, and introducing air under pressure interiorly of the container in such fashion as to support those walls being decorated, or labeled, against collapse or appreciable undesired distortion under pressure of the decorating device, such as would result in poor printing.

A further object of my invention is the provision of novel means whereby air under pressure existing within the container, at the time of printing upon or decorating the latter, is utilized later to quickly separate the container from a supporting chuck.

It is also an object of my invention to provide novel mechanism for handling hollow plastic containers, such as bottles, wherein air under pressure is introduced through a bottle neck engaging chuck directly into the chuck supported bottle and following printing or decorating of the latter, quickly separates the bottle from the chuck incident to axial outward movement or retraction of said chuck away from a base chuck.

Other objects will be in part apparent and in part pointed out hereinafter.

In the accompanying drawing constituting a part of my application:

The FIGURE is a sectional elevational view showing my invention embodied in a screen-type decorating or labeling machine such as that forming the subject of Denelsbeck Patent No. 2,113,576, issued April 12, 1938, and assigned to the assignee of the present application.

In this Denelsbeck patent the bottle B (FIG. 4) is rotatably supported by a vacuum chuck 13 for rolling contact with a decorating screen 34a carried by the frame 34 which reciprocates while a squeegee forces paint through the screen in a definite pattern or design onto the bottle surface.

My invention is adaptable for use with such a basic machine as shown in said patent and as revealed herein there is involved a base 10 supporting a conventional superstructure 11 including a screen-carrying frame 12 mounted upon a horizontally reciprocable carriage 13. A squeegee 14 is suspended from a standard carrier 15, both positioned, as usual, immediately over the screen (not shown) for contact with the upper surface of the latter. The screen carriage may be reciprocated in conventional fashion by a fluid operated piston motor 16, if desired.

The container supporting mechanism includes a freely rotatable base chuck 17, mounted upon the superstructure 11. The neck end 18 of the container C is supported by a chuck unit comprising a horizontally reciprocable non-rotating piston rod 19 axially aligned with the base chuck. This rod, at one end, is connected to a piston 20 which is housed in a horizontal cylinder 21 and at its outer or free end supports rotatively a chuck head 22. The piston 20 and cylinder 21 together provide a fluid or air motor M whose function is to reciprocate the chuck head 22, thereby moving it axially relative to the base chuck.

Specifically, this motor comprises the aforementioned cylinder 21 which is mounted upon a pedestal 23 carried by the base 10. A coil expansion spring 24 encircling the piston rod between the piston 20 and that cylinder head 25 adjacent the chuck head 22 yielding urges the piston and rod away from the base chuck. A stop sleeve 26 within the cylinder 21 positively limits possible advancing movement of the piston under the influence of air or fluid introduced into the cylinder through the inlet port 27. Both the pressure of the air introduced and the timing of its delivery to the port 27 are regulable by conventional devices (not shown).

The chuck head 22 includes a collar 29 and lock ring 30 connected to the free end of the piston rod 19 through a ball bearing 31. This ball bearing includes an inner ring 32 secured against rotation upon said rod and an outer ring 33 which is firmly connected to the chuck head by clamping it between the collar 29 and the threaded lock ring 30. A flanged frusto-conical plug 34 insertable in the neck opening of the container C and capable of sealing the latter against air escape is carried by a holder 35 which is removably secured in the collar 29 by a lock screw 36. This plug 34 obviously performs the added function of centering and therefore properly positioning each container for decorating purposes. To the end that air or fluid under pressure may be introduced into the container primarily to support it against collapse or distortion while being decorated, or labeled, and secondarily to aid in rapid discharge of decorated containers, I provide an axial passage 37 through a portion of the piston rod and connect it to an air pressure supply line L. A passageway 38 axially through the holder 35 and plug, together with said passage 37 and a chamber 39 in the head proper, provide a conduit for air being delivered to the container interior.

In operation the neck chuck is retracted from the base chuck 17 and a container placed with its base in the latter chuck, as shown. Thereupon air or fluid under pressure is delivered to the motor M resulting in movement of the piston and rod forwardly. Thus the chucking plug is projected into the container neck to both center the container and seal the neck opening against air escape. Substantially concurrently with this step, air under pressure is caused to flow through the supply pipe L to the chucking plug. Thus sufficient internal pressure is created within the container to effectively counteract any collapsing or deforming pressure that might be exerted against the container during printing or labeling. Upon completion of the decorating cycle, air flow control valves (not shown) are closed and pressure in the cylinder is exhausted in conventional fashion, allowing the spring 24 to retract the chucking plug 34. Immediately the pressure created within the container functions to blow the labeled or otherwise decorated container clear of the plug. Thereupon it may fall by gravity into a receiver (not shown).

Modifications may be resorted to within the spirit and scope of the appended claims.

I claim:

1. Apparatus for supporting a preformed expanded hollow neck-embodying plastic container in position to receive an exterior decoration or label, comprising a base chuck, a chuck head, a container neck-engaging and sealing plug forming a part of said head, means for imparting axial movement to the head to thereby move said plug into and out of holding engagement with the container neck and means including a passageway through the chuck head and plug for introducing air under pressure into the container sufficient only to support the latter against collapse during application of the surface coating thereto, the means for axially moving the chuck head comprising a piston-type fluid motor having a piston-rod connected to an outer free end to said head and including a connector between the rod and chuck head providing for free rotation of the chuck head about the axis of said rod.

2. Apparatus as defined in claim 1, the connector comprising an anti-friction bearing having an internal collar secured to the rod against rotation and an external collar rotatable freely about the internal collar and secured to the chuck head.

3. Apparatus for supporting a preformed expanded hollow neck-embodying plastic container in position to receive an exterior decoration or label, comprising a base chuck, a chuck head, a container neck-engaging and sealing plug forming a part of said head, means for imparting axial movement to the head to thereby move said plug into and out of holding engagement with the container neck and means including a passageway through the chuck head and plug for introducing air under pressure into the container sufficient only to support the latter against collapse during application of the surface coating thereto, the means for moving the chuck head axially comprising a piston-type fluid motor having a piston-rod connected to an outer free end to said head and the piston rod freely rotatably supporting the chuck head at a free outer end and having an axially extending air passageway leading to the passageway in said chuck head and plug.

References Cited in the file of this patent
UNITED STATES PATENTS

| | | |
|---|---|---|
| 2,202,799 | Jackson | May 28, 1940 |
| 2,601,825 | Blakey | July 1, 1952 |
| 2,751,701 | Grupe | June 26, 1956 |
| 2,763,415 | Bagarogy | Sept. 18, 1956 |
| 2,943,349 | Adams et al. | July 5, 1960 |
| 2,963,834 | Stanley et al. | Dec. 13, 1960 |